United States Patent [19]

Gagliardi et al.

[11] Patent Number: 5,444,703
[45] Date of Patent: Aug. 22, 1995

[54] ISDN INTERFACING OF PERSONAL COMPUTERS

[76] Inventors: Ugo O. Gagliardi; Meichun Hsu, both of 5 Manor Pkwy., Salem, N.H. 03079; Paul Cummings, 53 Lawndale St., Belmont, Mass. 02178; Stephen A. Mattin, 5 Manor Pkwy., Salem, N.H. 03079

[21] Appl. No.: 94,144
[22] PCT Filed: May 24, 1991
[86] PCT No.: PCT/US91/03612
§ 371 Date: Jan. 14, 1994
§ 102(e) Date: Jan. 14, 1994
[87] PCT Pub. No.: WO92/21185
PCT Pub. Date: Nov. 26, 1992
[51] Int. Cl.$^6$ .................. H04J 3/16; H04L 12/46
[52] U.S. Cl. ...................... 370/60.1; 370/79; 370/85.13
[58] Field of Search .......... 370/85.13, 85.14, 85.1, 370/110.1, 94.1, 85.7, 58.1, 58.2, 60, 60.1, 79

[56] References Cited

U.S. PATENT DOCUMENTS

| 4,993,014 | 2/1991 | Gordon | 370/16 |
| 4,996,685 | 2/1991 | Farese et al. | 370/58.1 |
| 5,023,868 | 6/1991 | Davidson et al. | 370/62 |
| 5,164,938 | 11/1992 | Jurkevich et al. | 370/60.1 |
| 5,208,811 | 5/1993 | Kashio et al. | 370/85.13 |
| 5,347,516 | 9/1994 | Yoshida | 370/94.1 |

Primary Examiner—Melvin Marcelo
Assistant Examiner—Min Jung
Attorney, Agent, or Firm—Lowe, Price, LeBlanc & Becker

[57] ABSTRACT

An ISDN gateway (GW) for personal computers (H) comprises at least one circuit board resident in each computer for carrying out protocol conversion and other network interface functions. To improve bandwidth of the ISDN line while transferring voice or data, a B-channel allocation algorithm executed by the gateway (GW) and the ISDN line dynamically allocates bandwidth by monitoring traffic at each destination queue and responsively allocating or deallocating virtual B-channels. Bandwidth utilization is optimized by packaging data packets into trains that are transmitted to the destination when the train is completed and upon satisfaction of other conditions. Each train undergoes data compression by execution of suitable compression algorithm.

13 Claims, 11 Drawing Sheets

ISDN INTERFACING OF PERSONAL COMPUTERS

TECHNICAL FIELD

The invention is directed generally to Integrated Services Digital Networks (ISDN), and more particularly to apparatus for enabling access to an ISDN line by a personal computer, or local area network.

BACKGROUND ART

ISDN is a relatively newly developed and emerging field of telecommunications which integrates computer and communications technologies to provide, worldwide, a common, all-digital network. This is based, in part, on standardizing the structure of digital protocols developed by the Internacional Telegraph and Telephone Consultative Committee (CCITT). Despite the implementation of multiple networks within national boundaries, from a user's point of view there is a single, uniformly accessible, worldwide network capable of handling a broad range of telephone, data and other conventional and enhanced services.

A complete description of the architecture of ISDN is beyond the scope of this specification. For details, and for an extensive bibliography of references on ISDN, see Stallings, *ISDN, An Introduction*, MacMillan Publishing Company, 1989.

An ISDN is structured by architecture closely following the OSI Seven Layer Reference Model. Within the framework of ISDN, the network provides services and the user accesses the services through the user-network interface. A "channel" represents a specified portion of the information carrying capacity of an interface. Channels are classified by two types, Basic Rate ISDN (BRI) and Primary Rate ISDN (PRI). BRI delivers two B-channels, each having a capacity of 64 Kbps, capable of transmitting voice and data simultaneously. A 16 Kbps D-channel transmits call control messages and user packet data. PRI provides twenty three B-channels of 64 Kbps capacity each for carrying voice, circuit switched data or packet data. The D-channel is a 64 Kbps signaling channel. The B and D channels are logically multiplexed together at Layer 1 of the OSI Reference Model.

FIG. 1 depicts the conventional ISDN interfaces. At the customer premises, an "intelligent" device, such as a digital PBX terminal controller or Local Area Network (LAN), can be connected to an ISDN terminal TE, such as a voice or data terminal, which is connected to a Network Termination (NT1). Non-ISDN terminals TE may be connected to a Network Termination (NT2) and a Terminal Adapter TA. The NT2 in turn is connected over an "S/T-Interface", which is a four-wire bus, to a termination NT1 that performs functions such as signal conversion and maintenance of the electrical characteristics of the loop.

At the local loop, a two-wire bus, termed the "U-Interface", or "Loop", interconnects NT1 and a Loop Termination (LT) at the central office. Finally, the "U-Interface" is a bus between the local loop at the carrier end and exchange switching equipment. Details of this architecture are provided in *ISDN: An Overview*, Data Pro Research, Concepts & Technologies, MT 20-365; pp 101–110, published by McGraw Hill, Incorporated (December 1988).

For connecting a personal computer to a conventional telephone line, a modem is required to convert outgoing digital signals generated by the computer into analog signals to be carried by the line, and to convert incoming analog signals to digital signals. Because an ISDN line is a digital network, however, no modem is required to interface a computer with the line; a computer is able to be connected to the ISDN line directly.

On the other hand, any interface between a computer and the ISDN must carry out conversion between the protocol stack implemented by the computer and ISDN protocol. The present invention provides gateway functions between personal computers and ISDN lines in a manner supporting existing communication protocols.

An interface may operate at any of several layers of the OSI model. A "repeater" is an interface operating at the physical link layer. A "bridge" interconnects networks at the data-link layer, and a "router" functions at the network layer. "Gateways" handle higher-level internetwork protocols. This terminology is not universal; for example, "gateway" sometimes is used to describe a "router", and it occasionally is used to refer to a "bridge". The term "gateway" will be used hereinafter to refer generically to any of these devices.

An ISDN gateway must satisfy several functions. It must be capable of transferring files on the ISDN at a very high rate of data transfer. The gateway furthermore must be "transparent" to the user, that is, the user of a computer should not be able to distinguish between data transfer among local resources and remote data transfer over the ISDN. Furthermore, standard communications software available for personal computers should be application to communications on the ISDN. Bandwidth utilization of the Network must be efficient and independent of the amount of traffic encountered.

Currently, gateway functions for personal computers are carried out by central office equipment in accordance with customer specifications. A need exists to establish gateway functions with equipment installed at customer premises to enable computers to be universally connectable to the ISDN. A further need exists to establish gateway functions having the characteristics described in the preceding paragraph.

DISCLOSURE OF THE INVENTION

Accordingly, one object of the invention is to interface personal computers to an ISDN line.

Another object of the invention is to interconnect personal computers to an ISDN line using customer premises equipment (CPE) carrying out gateway functions.

A further object is to interface personal computers and the ISDN line for very high rate of file transfer to or form a remote location.

A still further object of the invention is to carry out communications between computers transparently over an ISDN line, i.e., so that no difference between accessing local or remote data is visible to the user.

Another object of the invention is to interface personal computers to the ISDN line, enabling users to access the line while using resident software applications.

Still another object is to interface a local area network of personal computers to an ISDN line.

A further object is to enable personal computers using standard communications software to transfer data over ISDN lines.

The above and other objects are satisfied in accordance with one aspect of the invention by a gateway provided at the customer premises, translating protocols used on dissimilar networks and carrying out other network interfacing functions. In accordance with a preferred embodiment of the invention, the gateway comprises one or more circuit modules (ISDN LINE CARD, SYSTEM MASTER CARD, etc.) resident with a host computer, interfacing the host to the ISDN line. The circuit module (ISDN LINE CARD) includes means for performing protocol conversion of data flowing between the host and ISDN line through the gateway, means for establishing input and output destination queues, means for measuring traffic flow at each input and output destination queue during a particular time interval, and means for dynamically allocating channels on the ISDN line in response to traffic.

Preferably, the circuit module also includes a system master (SYSTEM MASTER CARD) for managing the configuration of the gateway and for accessing other gateways on the ISDN line. A communication mode adaptor (CMA) incorporated in the module provides modem dial-up protocols, and an ISDN manager receives and routes incoming data, setting up, selectively, circuit switched and virtual circuit calls and incorporating the aforementioned dynamic channel allocation functions. In the preferred embodiment, the circuit module further includes an ISDN device driver and a configuration control manager storing a table of gateway operating parameters.

In accordance with another aspect of the invention, dynamic channel allocation includes long term channel allocation means for allocating or deallocating transmission channels to a particular destination on the line depending upon data flow traffic to that destination and upon particular channel parameters, and short term channel allocation means. The short term channel allocation means overrides the long term channel allocation means in response to predetermined conditions for allocating or deallocating transmission channels on the ISDN line.

In accordance with a further aspect of the invention, the data is arranged in packets, and the module includes means for assembling pluralities of the packets into trains, each consisting of a predetermined number of packets, for transmission on the ISDN line. Preferably, the trains are compressed prior to transmission to improve bandwidth utilization.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respect, all without departing from the invention. Accordingly, the drawing and description are to be regarded as illustrative in nature, and not as restrictive.

BEST MODE FOR PRACTICING THE INVENTION

1. Overview

Figure 1:
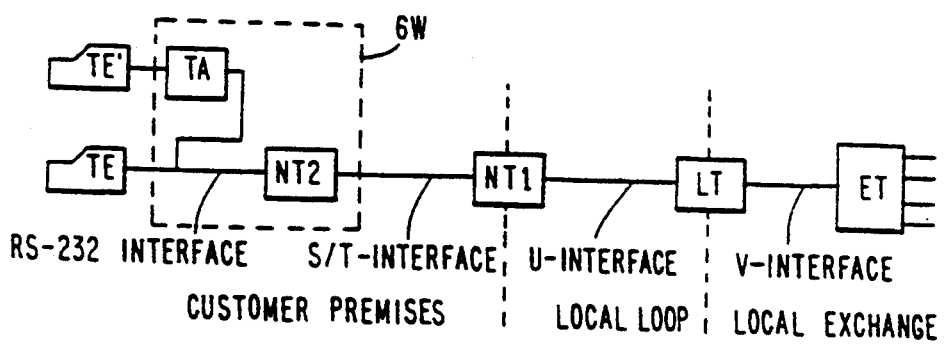
FIG. 1 is a simplified circuit diagram of an Integrated Services Digital Network.
Figure 2:
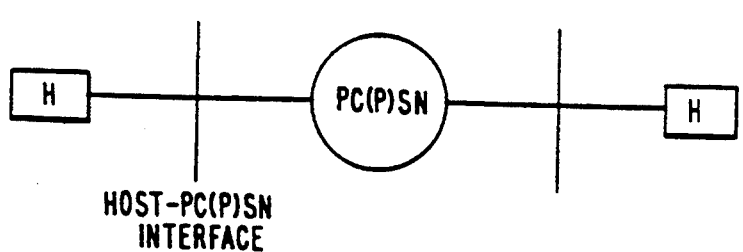
FIG. 2 is a symbolic diagram showing a conventional public circuit or packet switched network.
Figure 3:
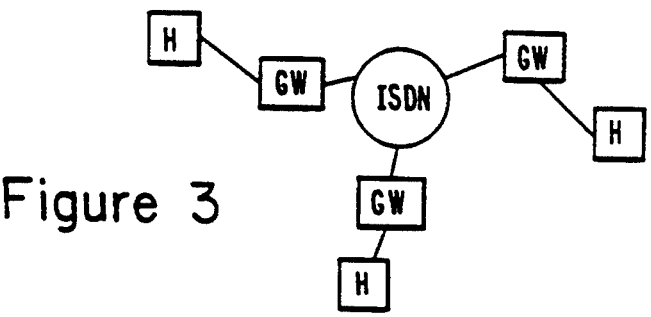
FIG. 3 is a symbolic diagram showing interfacing of personal computers to ISDN lines through ISDN gateways in accordance with one aspect of the invention.
Figure 4:
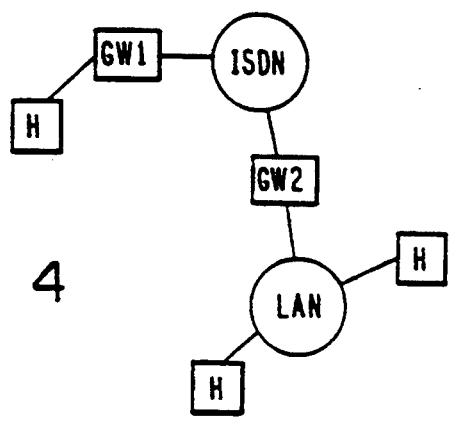
FIG. 4 is a symbolic diagram showing interconnection of a remote host to an existing local area network through an ISDN gateway, in accordance with another aspect of the invention.
Figure 18:
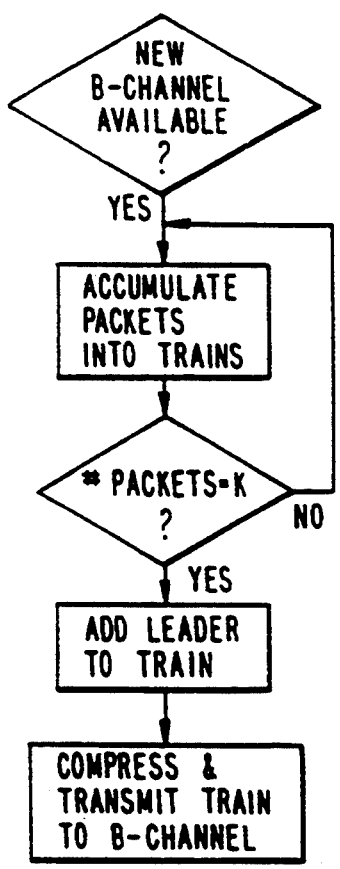
FIG. 18 is a flow chart describing assembly and compression of packet trains for transmission to a new B-channel.
Figure 19:
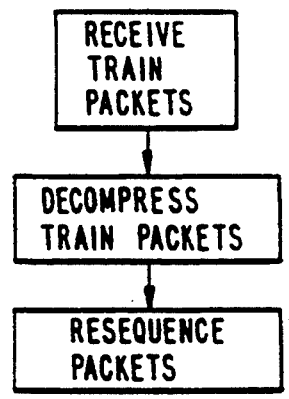
FIG. 19 is a flow chart showing decompression and resequencing of packets.
Figure 21:
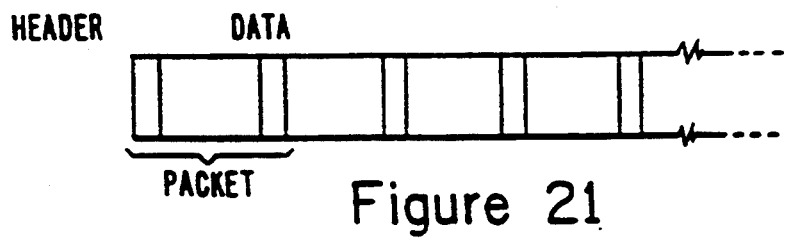
FIG. 21 depicts a train of packets in accordance with a further aspect of the invention.

An ISDN gateway for personal computers comprises at least one circuit board resident in each computer for carrying out protocol conversion and other network interface functions. One embodiment of the gateway enables any computer so equipped to be connected to an ISDN line, as shown in FIG. 3. Another embodiment enables an ISDN line to be connected to a local area network of computers (FIG. 4). To improve bandwidth utilization of the ISDN line while transferring voice or data, a B-channel allocation algorithm executed by the gateway, as described in FIG. 13–16 dynamically allocates bandwidth by monitoring traffic at each destination queue and responsively allocating or deallocating virtual B-channels. Bandwidth utilization is optimized by packaging data packets into trains, shown in FIG. 21, that are transmitted to a destination when the train is completed and upon satisfaction of other conditions. Each train undergoes data compression by execution of a suitable compression algorithm shown in FIG. 18 followed by restoration in accordance with an algorithm of FIG. 19.

2. Network Architecture

Figure 5:
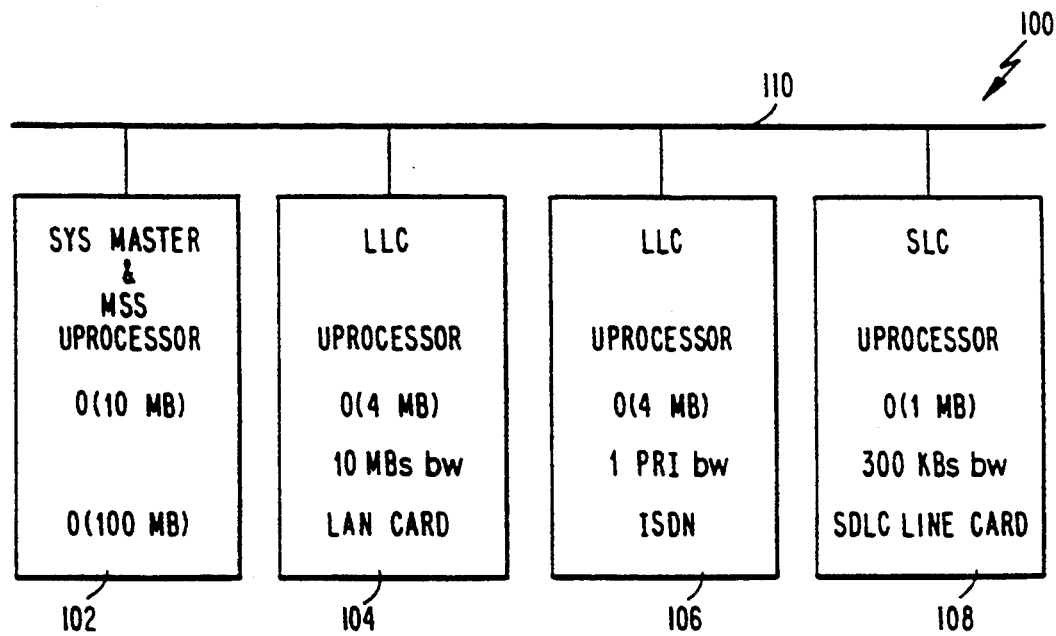
FIG. 5 is a simplified block diagram showing hardware architecture of an ISDN gateway at the customer premises in accordance with the invention.

Referring to FIG. 5, an ISDN gateway 100 of a type shown in FIGS. 3 and 4, in accordance with the invention, comprises a "module" having four hardware elements 102, 104, 106, 108 interconnected by a common bus 110. The elements 102–108 preferably comprise individual circuit cards, although some or all of the elements may be incorporated in a single circuit board. The board or boards preferably reside within a personal computer but alternatively may reside outside the computer as an "outboard" module.

Element 102 is a system master which implements infrequent user functions, such as configuration management and connection requests. The system master 102 furthermore functions as a standard computing platform, emulating an IBM compatible PC or other computer standard.

LAN line card 104 implements firmware and hardware for specific IEEE 802 physical and data link protocol will be required for other LAN connections, e.g., 802.5 Token Ring and 802.3 Ethernet. Details on the content LAN line card 104 are given in copending application Ser. No. 08/094,143, to Gagliardi et al., entitled "ISDN Interfacing of Local Avenue Networks", filed on common date herewith and incorporated herein by reference.

ISDN line card 106 comprises firmware and hardware implementing the ISDN physical, data link layer (LAPD), and the D-channel layer 3 protocol, and the physical layer of the B-channel. Software incorporated in the ISDN line card 106 implements train protocol and B-channel allocation algorithms as well as data compression algorithms to support a virtual broad band capability of the gateway, described in copending application Ser. No. 07/976,923, to Chen-Hsu Ko et al., entitled "Dynamic Channel Allocation Method and System for Integrated Service Digital Network", incorporated herein by reference. SDLC line card 108 includes firmware and hardware to implement the SNA physical and data link (SDLC) layers. This card is optional to the Network.

3. Software Architecture

Figure 6:
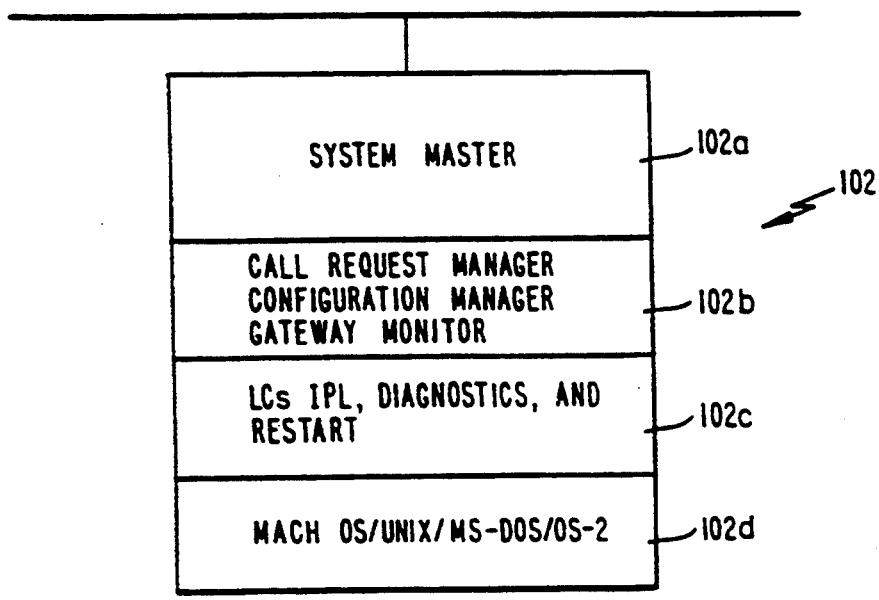
FIG. 6 is a diagram of software architecture incorporated in the system master card shown in FIG. 5.

The software architecture of system master element 102, shown in FIG. 6, is configured with three layers of software underlying the system master 102(a) in a stack. The underlying layers comprise call request management, configuration management and monitoring layer 102(b), as well as layers 102(c), 102(d) for implementing a computing platform.

Figure 7:
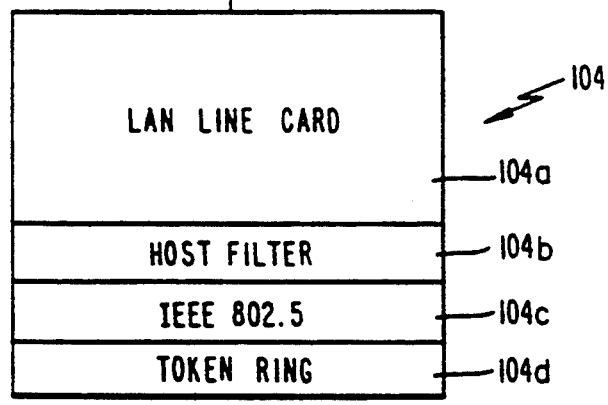
FIG. 7 is a diagram of software architecture showing one embodiment of a LAN line card of FIG. 5.

In FIG. 7, the software architecture of one embodiment of a LAN line card (LLC) 104 for 802.5 Token Ring comprises a functional layer 104(a) together with a layer 104(b) comprising a host filter, receiving and selectively processing packets addressed to the host. Underlying layers 104(c), 104(d) in this example implement the specific IEEE 802 physical and data link protocol (802.5) for Token Ring.

Figure 8:
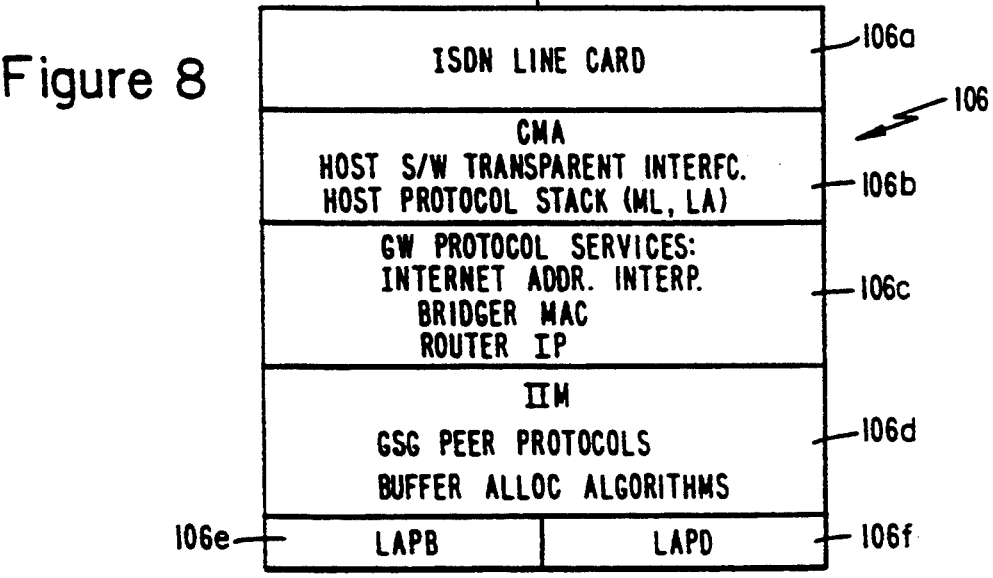
FIG. 8 is a diagram showing software architecture incorporated in an ISDN line card shown in FIG. 5.

In FIG. 8, the software architecture of the ISDN line card 106 comprises a functional layer 106(a), together with underlying layers 106(b)–106(f) for carrying out the requirements of the OSI Reference Model layers associated with ISDN. These layers include a communication mode adapter (CMA) at layer 106(b) and protocol services at layer 106(c). Layer 106(d), IIM, carries out gateway peer protocol and executes buffer allocation algorithms to be described in detail later. Peer protocols, applied on B-channel used by the gateway to implement train packing, compression and error handling, are also described later.

Figure 9:
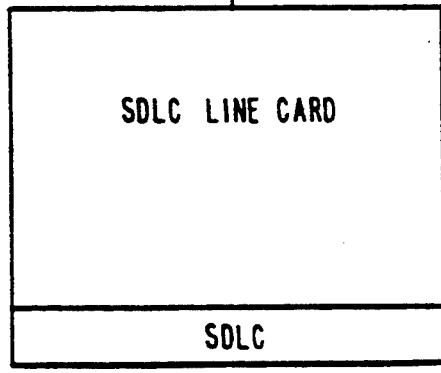
FIG. 9 is a diagram of software architecture incorporated in the SDLC line card shown in FIG. 5.

FIG. 9 depicts software architecture of the SDLC line card implementing the SNA physical and data link layers for carrying out inter-networking among hosts.

Figure 10A:
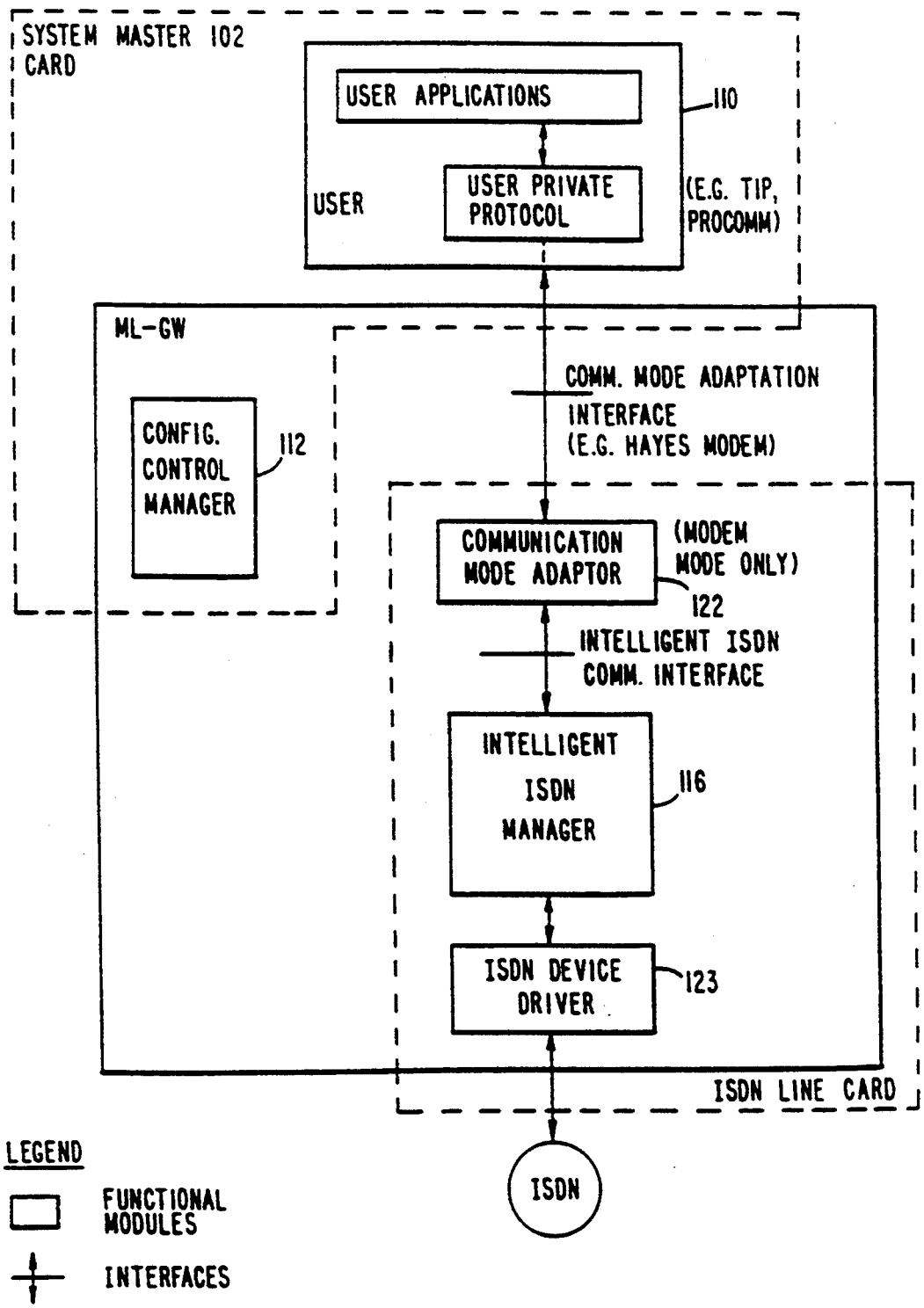
FIGS. 10(a) and 10(b) are diagrams showing mapping of software to hardware components within the ISDN gateway of the invention.
Figure 10B:
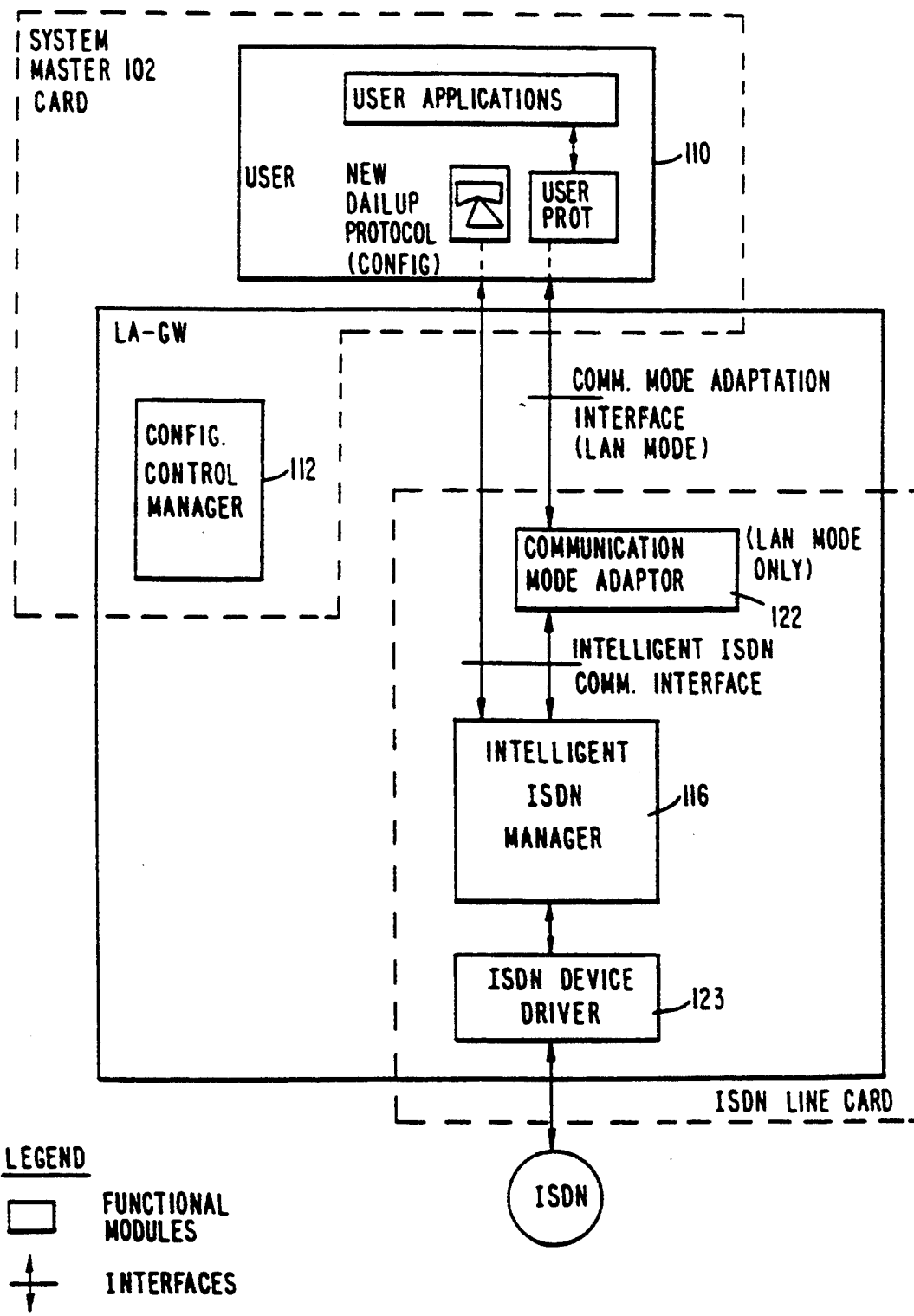

Mapping of software shown in FIG. 6–9 to hardware components of FIG. 5 is symbolized in FIGS. 10(a) and 10(b). FIG. 10(a) depicts the software architecture of the gateway configured to interface a personal computer with the ISDN (MODEM-TYPE) as shown in FIG. 3. Within the system master card 102, a USER software module 110 supports user application software and protocol stack residing at layer 7 of the OSI Reference Model. Configuration control manager 112 of the system master monitors bandwidth allocation and errors. The system master card 102 manages configuration of the gateway, providing status, billing and information tracing on the use of resources in the gateway, as well as access to internal tables used by bridging and routing gateway services. The system master 102 further updates records loaded on disk into memory resident data structures when the system is initiated. When these tables are updated, the disk is automatically updated as well.

Configuration control manager 112 controls parameters which define the resources available to the gateway and the access privileges to the system master 102. Manager 112 maintains a configuration table for parameters controlling the operation of the gateway. The table, implemented in software, defines the ISDN configuration including number of channels allocated to the gateway, characteristics of the channels and all directory numbers associated with the gateway. Also stored are characteristics of the types of interconnections of the host side of the network, e.g., RS-232, DMA, etc., and default parameters for incoming calls, e.g., select all non-collect calls, allow collect calls with proper user information and collect calls only from particular numbers. Level of system monitoring, also retained by the control configuration manager tables, controls available options and enables the amount of overhead associated with those options to be limited. Password information for access to the gateway and user profiles determining what kind of activities are allowed to a given user or a class of users also are retained in the manager tables.

A connection request manager (not depicted), included in module 112, controls a table containing information required to set up a B-channel or remote gateway. This information includes at least one remote ISDN number for the connection and any user information required in the layer 3 set-up message. During operation of the gateway, this table also records whether the connection is established and provides a handle for the connection which can be used to direct packets to a destination manager.

Configuration control manager 112 collects statistics for B-channels, such as channel utilization including a statistical sampling to determine the percentage of idle capacity on the channel, possibly on a per-connection basis. Since each channel is bi-directional, measurement takes place both on the outgoing and incoming lines. Information also is maintained on any delay for packets in the system, as well as on the "high water mark" in the buffer pool for a given destination and the number of buffers discarded for a destination due to memory constraints. For channels that are connected, the percentage of frames sent or received in error will also be recorded for use, among other ways to determine the type of data link protocol applied to a given destination.

A packet passed to the user module 110 is meant to be handled by some application or protocol software resident on the same node as the gateway. An example of such a program is a private protocol router.

The use module 110 of system master card 102 interfaces with communication mode adapter (CMA) 122 of the ISDN line card 104 through a communication mode adaptor interface 124. The CMA 122 is configured for operation in a modem mode, allowing the user module 110 to interface with other user modems. In FIG. 10(b), the CMA 122 is configured to interface with a local area network as shown in FIG. 4, enabling a host to connect to a remote LAN as if it were on the LAN once the connection is set up. The host furthermore is enabled to use existing LAN network/communication software to communicate with hosts on remote local area networks. To the host, the gateway appears to be a physical connection to a virtual LAN while the host interacts with the ISDN and remote gateways.

Figure 11:
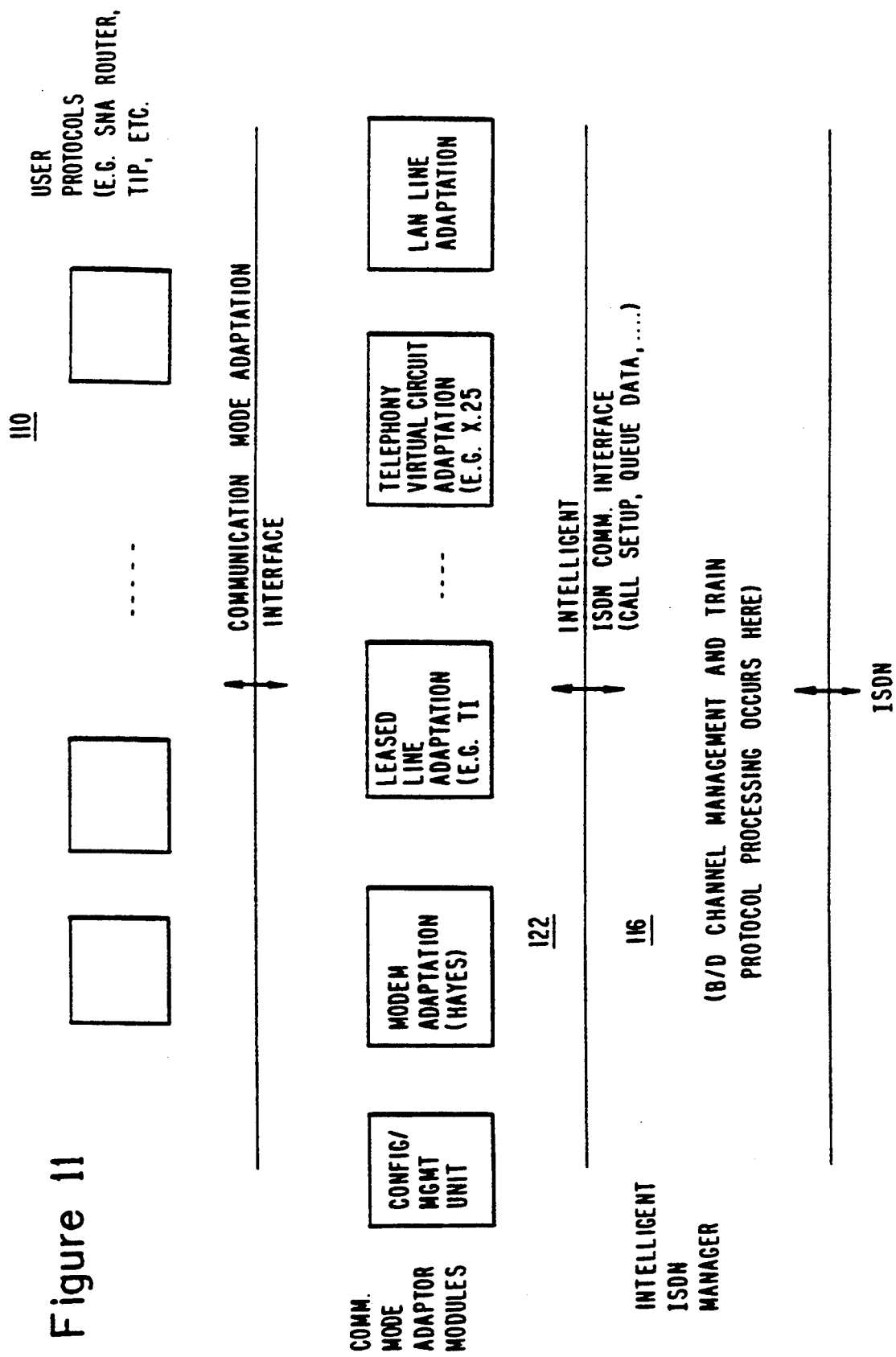
FIG. 11 is a diagram showing operation hierarchy in the ISDN line card shown in FIGS. 10(a) and 10(b).

The architecture of CMA 122 is depicted symbolically in FIG. 11. The gateway services module 120 provides gateway functions for private protocol stacks. Name and address resolutions are performed at the user module 110, incorporating existing software of the private protocol stacks or performed within gateway services module 120. In the latter case, the gateway services module 120 can be performed at an existing private network/inter-network protocol stack, re-implemented as required for particular applications.

The intelligent ISDN manager (IIM) 116 receives packets of data and commands to set up virtual circuits. The IIM 116 implements train packaging and B-channel allocation as well as data compression. The content and operation of IIM 116 will be described in the next section.

Peer protocol implemented by IIM 116 ensures that data packets arrive to the remote gateway in the same order as they were received by the local gateway. Peer protocol provides a transport level surface to sequence all packets for this purpose.

5. Dynamic Bandwidth Allocation

A further aspect of the invention involves improving bandwidth utilization of the ISDN line while using gateway features. A B-channel allocation algorithm executed by gateways between terminals and the ISDN line dynamically allocates channel by monitoring traffic at each destination queue, shown in FIG. 12, and responsively allocating or deallocating virtual B-channels. Bandwidth utilization is optimized by packaging data packets into trains that are transmitted to the destination when the train is completed and upon satisfaction of other conditions. Each train undergoes data compression by execution of suitable compression and correction algorithms.

More specifically, B-channel allocation, implemented by an allocation algorithm to maximize utilization of the channels, minimizes response times and the probability of losing data packets due to buffer overflow. The channel allocation algorithm, residing within the B-channel manager of IIM 116 (FIG. 12), includes commands to establish user-level connections to destinations and to send and receive data. Data passed to the IIM 116 is queued in destination queues. The channel allocation algorithm monitors the status of the destination queues, and dynamically allocates ISDN channel bandwidth to these queues. The following definitions support the channel allocation algorithm.

A "destination", which is a connection at the router level, typically coincides with a physical router. If peer protocol is compatible, all user-level connections of various types, such as virtual circuit, modem connections, LAN, packets, etc., can multiplex within the same router connection. If the peer routers are incompatible, multiple router-level connections to a single physical gateway are necessary.

Associated with each destination is a "destination queue", denoted as $Q(d)$, consisting of a pool of buffers. The pool of buffers for destination d comprises the messages destined for d. The number of buffers in $Q(d)$ is denoted as $b(d)$; it is assumed that B-channels output from or input to a buffer in parallel, with each buffer having a fixed maximum size.

A number of B-channels currently allocated to a destination B is denoted as $B(d)$. If a queue $Q(d)$ becomes too long relative to the number of channels allocated to d, an extra channel is allocated. On the other hand, if $Q(d)$ is relatively short compared to the size of $B(d)$, some channels are released. If no buffers are available for accumulation of a new train at a destination d, a "buffer fault" is created.

Events that define the length of a packet train trigger the invocation of the buffer allocation algorithm these events comprise packets arrivals at ISDN line card 106 for transmission to the public network. There are four conditions that must be considered:

1. If a destination d is known, and $Q(d)$ contains an "open" buffer, that is, a buffer that is not filled to the maximum length, the packet is accumulated into the train.
2. If the destination d is known, but no "open" buffer is available in $Q(d)$, a new buffer is created and a new train is started.
3. If the destination d is known, but an "open" buffer is about to fill up, the packet is accumulated in the current open buffer. Thereafter, the buffer is closed to seal the train.
4. If destination d is unknown, a new buffer pool is started for a new train.

The channel allocation algorithm operates asynchronously to the buffer allocation algorithm described previously. As one important aspect of the invention, the channel allocation algorithm is partitioned into two components, long term allocation and short term allocation.

6. Long Term Channel Allocation

Long term allocation, LTA, monitors the recent historical track pattern to and from a destination, and decides upon the bandwidth and types of channels to be allocated to that destination. Short term allocation, STA, monitors the current size of the destination queues and the aging constraints of these queues, and decides whether to deviate, temporarily, from decisions of the long term allocation algorithm. This enables response to situations that are not well-handled by long term allocation, e.g., situations arising due to a temporary or sudden surge of traffic to certain destinations not predicted based on the long term allocation algorithm. Decisions on bandwidth allocation produced by the long term and short term allocation algorithms preferably are stored in charged memory, and are carried out at convenient intervals by ISDN channel processes to be described later.

Channel allocation is described herein for B-channels, although similar allocation can be carried out for D-channels as well. In general, B-channels can be used in a circuit switched mode or in a packet switched mode using data formats show in FIGS. 20(a) and 20(b). The circuit switched mode preferably is used only to transmit data between low-traffic destinations in view of the relatively high set-up/tear down overhead required. The packet switched mode is preferably for transmission to destinations with a low-traffic rate if there is a moderate response time requirement. For destinations that require higher traffic rate or have more stringent response time requirements, use of B-channels in the circuit switched mode is preferable. For destinations that do not have high traffic rate but have very stringent response time requirements, the B-channels should be dedicated in the circuit switched mode and deliberately underutilized.

Figure 13:
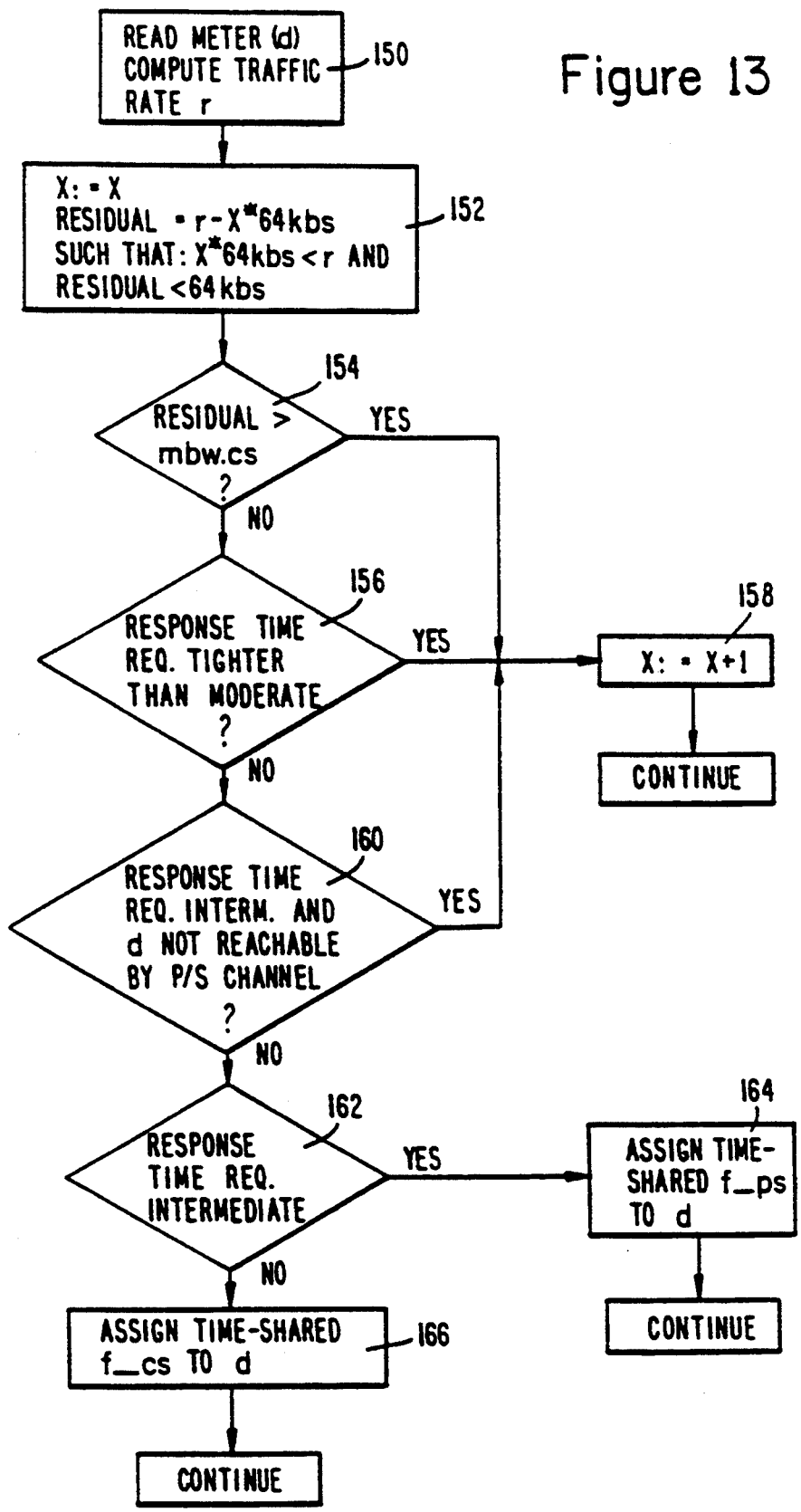
FIG. 13 is a flow chart of algorithms for carrying out LTA channel allocation in accordance with as aspect of the invention.

The LTA algorithm is summarized in the flow chart of FIG. 13. The traffic rate R at each destination is monitored by a software flowmeter, which may be a counter of data quantity arriving at the destination queue within a particular interval of time. Each software flowmeter is polled at fixed intervals (w). The flowmeter is read, then reset, and the reading is used by the LTA to determine how many B-channels are to be allocated to that destination.

One embodiment of a LTA algorithm LTA, in accordance with the invention, is as follows. Referring to FIG. 13, step 150 reads a traffic rate R for a destination d, wherein R is defined as follows $$r = Max \{v\_in\ (d,\ t-w,\ t)/w,\ v\_out\ (d,\ t-w,\ t)/w\},$$

where t is the time when the meter is read, $v\_in(d, t-w, t)$ is the accumulated input traffic volume for destination d between time t and $t-w$, and $v\_out(d, t-w, t)$ is that for the output queue.

In step 152, an integer x, that is greater than or equal to zero, is found such that $$x^* hbw\_cs \leq r \leq (x+1)^* hbw\_cs$$

and xB channels in circuit switched mode are allocated to destination d, where $hdw\_cs$ the achievable bandwidth once set up for a circuit switched mode B-channel. This number in practice is close to 64 Kbs.

Assuming that residual=$r-x^*hbw\_cs$, step 154 determines whether residual is greater than $mbw\_cs$, where $mbw\_cs$, is the minimum utilization of a circuit switched B-channel, or whether the response time is more stringent than moderate (step 156). The term "moderate" is defined to be the response time that can be offered by a packet switched channel. If either condition is true, than one more B-channel is allocated to destination d (step 158).

On the other hand, if $0 \leq residual \leq mbw\_cs$ and the response time requirement is moderate or more relaxed than moderate, and traffic is suitable for packet switched channels, a fraction of a packet switched channel is allocated to destination d, wherein the fraction f is determined as follows.

$ebw\_ps$=effective bandwidth of a packet switched B channel

In step 160, if destination d is not reachable by packet switched channels, or the packet is not of a nature that is suitably transmitted through packet switched channels, and the response time requirement is very relaxed (step 162), then a fraction of a circuit switched mode channel is allocated to destination d (step 164). The fraction in this example is determined by the size of the residual. The notation used in the above algorithm is as follows.

x, f: decision variables
t, r, residual: state variables
$ebw\_ps$, $hbw\_cw$: ISDN performance profile
$mbw\_cs$, w: algorithm control parameters
response time requirements for packet transmission:
  tight: $\leq 260$ ms
  moderate: between z seconds and 260 ms
  very relaxed: $\leq =z$ seconds.

In addition, the algorithm is sensitive to the transmission delay of packet switched channels and the ISDN call set-up and tear down times for circuit switched mode. The former is used to derive a boundary between moderate and height response time. The latter is used to calculate the response time obtainable for time-shared fractional allocation of B-channels in circuit switched modes, which in turn determines the value of z which defines the boundary between moderate and very relaxed response time requirements. The basic logic of the algorithm remains unchanged under different performance profiles.

An important algorithm control parameter is the "meter window" w, which is selected such that the algorithm is sufficiently sensitive to short-term fluctuation in traffic intensity but is not too sensitive. If w is too small, a very short-termed surge in traffic may result in too many B-channels allocated and therefore will incur a high set-up tear down overhead. If w is too large, the algorithm may not be responsive enough to a short term search, resulting in a fast destination queue build-up. An excessive amount of buffer space may be consumed and response time may be degraded.

To attenuate sensitivity, the following method uses weighted averaging of traffic in multiple windows. If a window system w with three windows w1, w2 and w3 is used, with weights wt1, wt2 and wt3, where the sum of wt1−wt3 is unity, traffic rate r can be equated to R(d, t, W,) computed as follows:

$$R(d,\ W,\ t) = v(d,\ t-w1,\ t)/w1^*wt1 + v(d,\ t-w1-w2,\\ t-w1)/w2^*wt2 + v(d,\ t-w1-w2-w3,\\ t-w1-w2)/w3^*wt3$$

With this generalization, to allow the algorithm to be more sensitive to short term fluctuation and less to the long term pattern, wt1 should be increased and wt3 decreased, and vice versa. Multiple counters are maintained for each destination queue using this strategy.

7. Short Term Channel Allocator

The LTA algorithm functions well in cases where there are sufficient B-channels available and decisions made by LTA are feasible. This means that the total number of B-channels allocated by LTA is smaller than the total number of B-channels subscribed, and sufficiently smaller such that the probability that an incoming call request finds all channels busy is very small, and further that the recent past history in fact represents a good basis for allocation. When such conditions are not met, the STA algorithm must be implemented.

In general, STA makes decisions which override, temporarily, decisions made by LTA. Channel processes, described later, implement decisions made by LTA under normal circumstances. When a B-channel is just "freed" from servicing an input and output buffer, the B-channel process checks to see if a decision has been made to deallocate channels from the destination d. If so, it deallocates itself and finds a new destination for which a decision has been made by LTA to have additional channels allocated. However, when unusual conditions are detected, such as a destination queue being ignored for too long, or a B-channel process encountering an empty destination queue, self-adjustment may be performed by the B-channel process to execute decisions rendered by STA. Two examples to which STA responds are (1) if any buffer in the destination queue d is found to exceed an age limit, or (2) if the following quantity exceeds a relative queue size limit:

$$\frac{\sum_{k} T_k(d_i)}{B(d_i)} \quad (3)$$

Where:

$T_k(d_i)$ = size of $k$th train for the $i$th destination
$B(d_i)$ = no. of B-channels assigned to the $i$th destination The above relationship is satisfied when the quantity of data in all trains to a particular destination exceeds the number of B-channels assigned to that destination.

Figure 14:
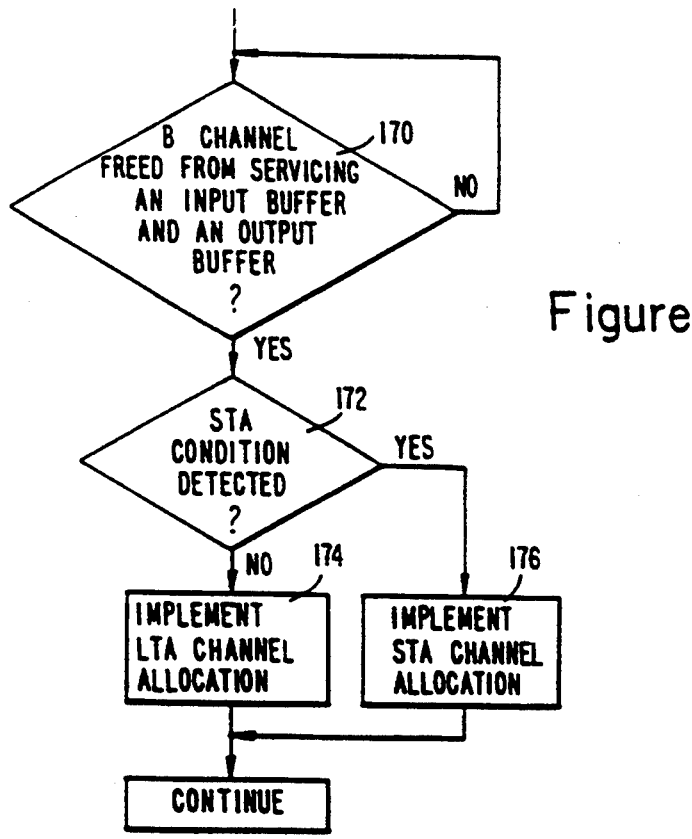
FIG. 14 is a flow chart of algorithms for selecting between LTA and STA channel allocation.

Logic implementing execution of the STA is shown in FIG. 14, wherein step 170 waits until a B-channel is freed from servicing in the input buffer and the output buffer, and then waits for an STA condition, such as the two conditions previously described, to be detected (step 172). LTA is implemented in step 174 unless the STA condition is detected. In response to an STA condition, STA channel allocation is carried out in step 176, and the process continues.

8. B-Channel Processes

Figure 15:
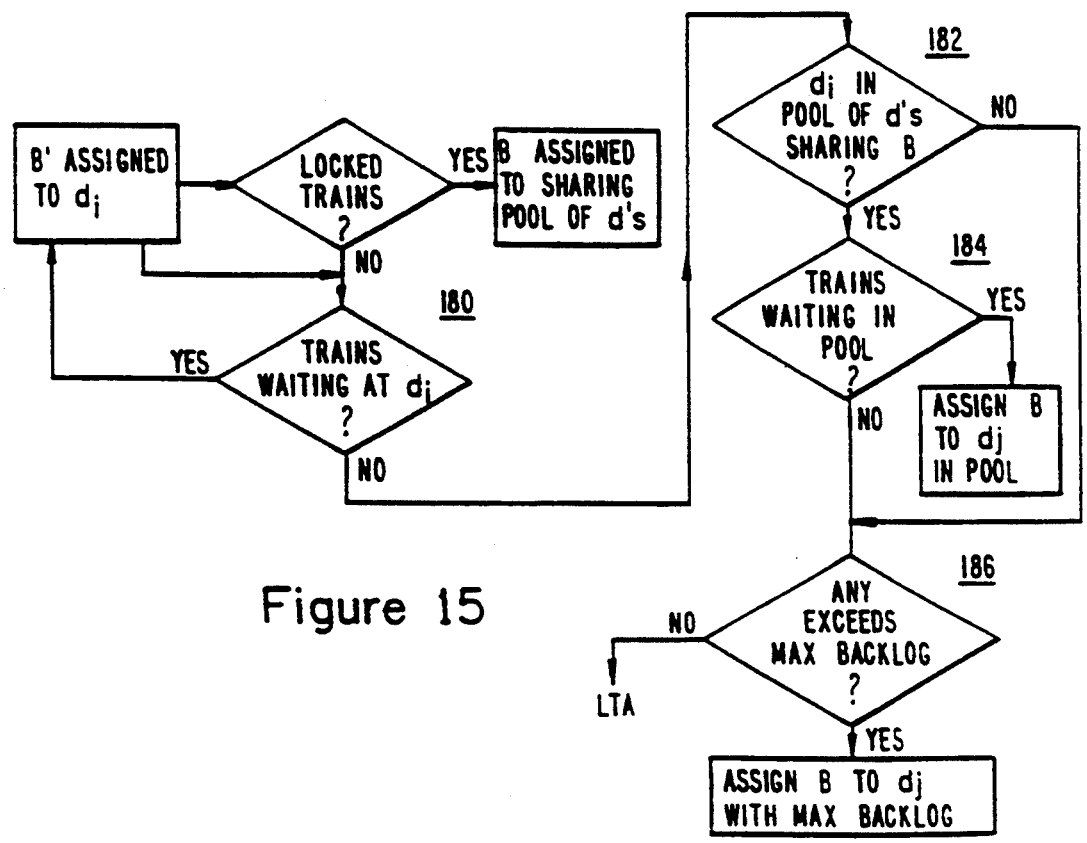
FIG. 15 is a flow chart of channel processes responding to decisions made by both the LTA and STA channel allocation algorithms.

An important aspect of the invention involves the B-channel processes which respond to decisions made by both the LTA and STA. Referring to FIG. 15, channel process invocation is triggered in response to an end of train transmission on any B-channel for input or output traffic. There are three different cases for reallocating a recently freed B-channel to release an emptied buffer to a free buffer pool:

1. The first part of the channel process algorithm at 180 prevents locking out trains associated with low traffic rate destinations, or locking out incoming call requests. Executing lockout prevention at the first part of the algorithm eliminates possibility of lockout. Since this part of the algorithm tends to disturb stable allocations of B-channels to high intensity traffic streams, probability of invocation preferably is modulated inversely to the number of B-channels assigned to the destination associated with the just freed B-channel.

The probability of invocation is higher if the B-channel is allocated fractionally to a high number of distinct destinations. Probability of invocation is lower if more B-channels have been allocated to the same destination. In other words, the higher the traffic rate for a destination d, the lower the probability of causing a "wild" deallocation of one of its B-channels to handle of locked out trains.

Sealed trains are time stamped. A check is made by STA over the entire buffer pool for all destinations to see if there are trains whose age exceeds a predetermined age limit. If any are found, absence of B-channels allocated to their destinations are checked to confirm that trains are truly locked out. If such a flag is found, the just freed B-channel is associated to all respective destinations, originating fractional allocations of B-channels, the oldest locked out train is selected and transmitted. A condition wherein the age limit is set at a sufficiently high level, and if overall traffic does not exceed the capacity of the gateway is very rate. This condition must be rare to avoid thrashing in the allocation of B-channels, and must be handled as the first priority decision to avoid blocking trains associated with very low packet rates.

2. If any complete train is waiting for a transmission to the same destination, in step 182 of the flow chart, the B-channel is re-used to transmit it. Giving priority to the same destination re-use of the B-channel minimizes ISDN call overhead.

3. If no complete train is waiting for transmission toward to the same destination, step 184, two subcases are considered. In the first subcase, the just freed B-channel is fractionally allocated to n destinations. The remaining n−1 destinations are checked for waiting trains, and if one is found the channel is assigned to it for transmittal. This allows maintenance of "stable" pools of low traffic rate destinations. If none are found, the following second subcase is executed. If not complete train is waiting for destination d_sub_i, g_Queue_Size is checked, and if set, a new destination d_sub_j is computed as the one which contains the largest relative queue size. Thereafter, the channel process remains with decisions made by LTA.

9. Train Packaging

Packet sequences are mapped into cargo destinations, with many packet sequences being designated to a single cargo destination. Mapping of packet sequences to cargo destinations is supported by system master 110. Of particular importance, a cargo destination is divided into many trains of a format shown in FIG. 21 in accordance with an aspect of the invention. A train contains an integral number of packets. There is no limit to the size of a train, although the size is predetermined and all gateways preferably use the same maximum train size so that fixed size buffers can be implemented.

The content of a train is compressed as describe hereinafter, then "framed" by adding start and stop sequences, a checksum and other frame control information. Peer control protocol preferably specifies the description of a frame, including details of the frame header and data fields. This model enables the peer protocol to operate at three different levels, PS packets (803 packets having a PS header), trains and frames. The following diagram shows transformations that a packet undergoes both as a packet arrives to a gateway from a local area network and as the packet is transferred back to a different local area network:

802.5 LAN 1

(full 802.5 frame) GW Lan Card (802.5 packet stripped of fields not covered by the checksum)

Packet Sequence Builder (PS header + stripped 802.5)

Train Builder (buffer of PS packets) Destination Known

Frame Builder (Frame Header + compressed Train (bit array) + Frame Trailer)

B Channel

64 Kbs bit stream

ISDN

Figure 20A:
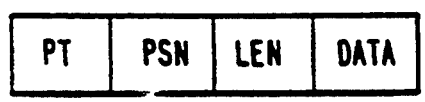
FIG. 20a and 20b are diagrams respectively of a packet and a data frame implemented in the invention.
Figure 20B:
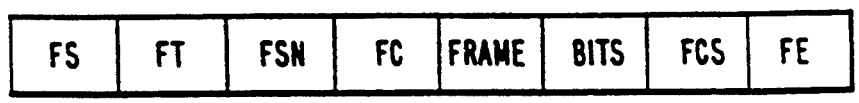

FIG. 20a shows a PS packet comprising the following fields: PT (packet type), PSN (Packet Sequence Number), LEN (Length of Stripped Packet) and Data. A data frame format, shown in FIG. 20b as another alternative, comprises the following fields: FS (Frame Start), FT (Frame Type), FSN (Frame Sequence Number), FC (Frame Control), Data, FCS (Frame Checksum) and FE (Frame End).

Figure 12:
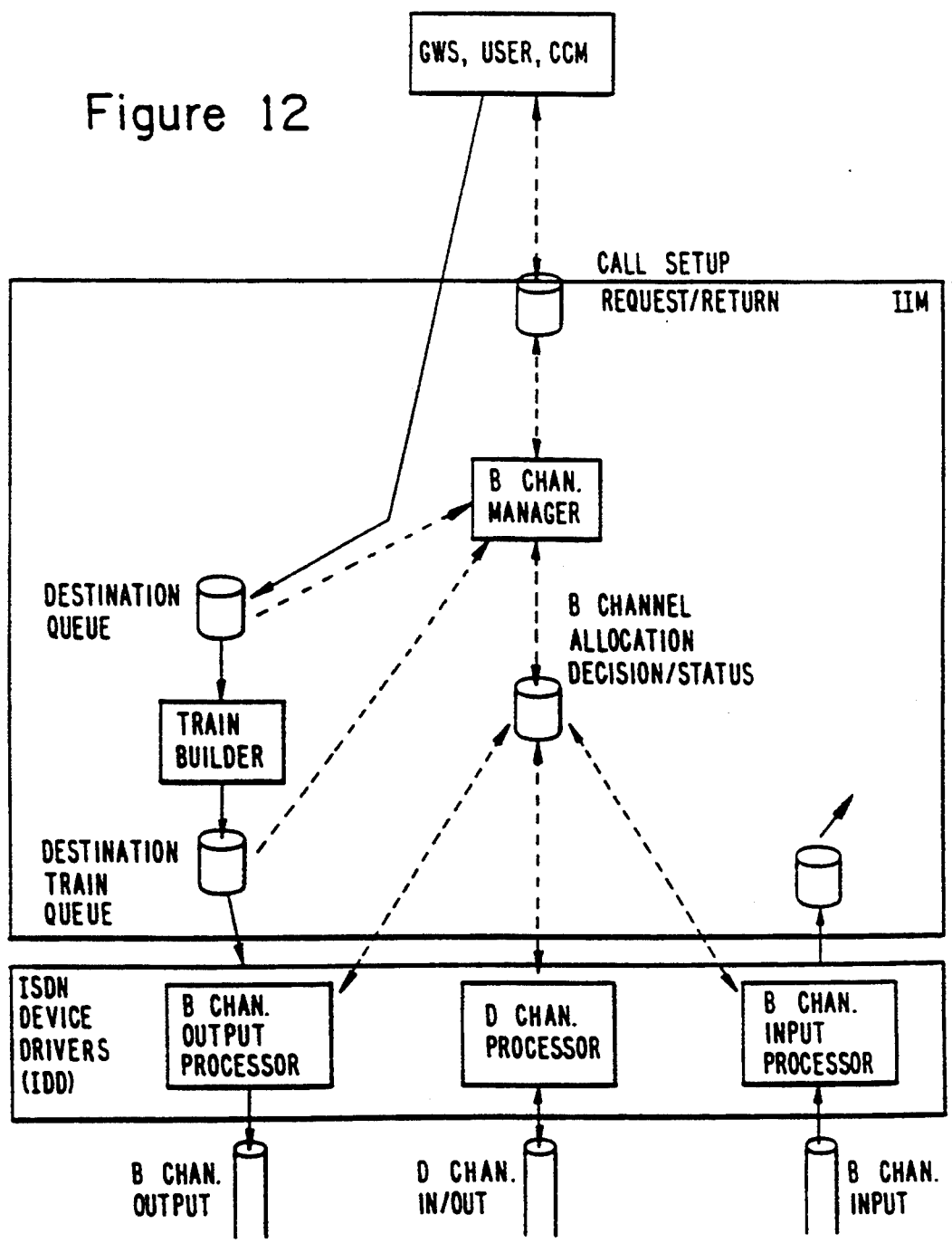
FIG. 12 is a symbolic diagram of the communication mode adapter incorporated in the ISDN line card.

Calls from a cargo destination manager determine the cargo destination for the received packet. The size of each queue and the hold time of each queue not being serviced by the train builder is communicated to the B-channel allocation manager (FIG. 12). The PS header has a packet sequence number to each packet, and the initial packet in a sequence is assigned sequence number 1. The PS header is removed from the 802 packet, checked and may be described.

Assuming the packet is valid, it is sequenced as follows. If the packet sequence number is 1, the bridge manager is notified that a new conversation with a remote node has been initiated by the remoted node, and the bridge manager will update the bridge data base. If the sequence number is not 1, the number is checked to see if there was a gap from the last packet received. If a gap exists, the packet is queued, and a timer is set. If the missing packet arrives before the timer expires, the queue is re-ordered, and the packets are released in order. Otherwise, the number of received packet is recorded, and the packet is released. If a packet with a lower sequence number subsequently arrives, it is discarded. The 802 packet type is checked and 802 protocol translation is carried out if necessary, i.e., translating an 802.3 packet to an 802.5 packet.

The train builder requests packets from the cargo destination manager, allocates and fills buffers and maintains the number of bytes used in the buffer. Received buffers are unpacked and passed to the level above after being parsed to ensure that no error in transmission has occurred. A compressor compresses the input buffer using a compression algorithm as described in the next section. Incoming data is decompressed and tested to confirm that it will fit in a new buffer; if not, an error is indicated.

In frame management, a data frame is built by adding a frame header and trailer to the active bits in the buffer. The B-channel allocation manager indicates when the frame control bits should be set to "last frame". The frame is gated onto the B-channel for the destination found in the buffer control block. The buffer is freed after being gated to the B-channel.

For incoming data, a buffer is allocated for the arriving frame. The frame is checked using the FCS, and any frames in error are discarded. Control frames are supplied to the system master. Data frames are supplied to the compression manager, and the B-channel allocation manager receives a "last frame" setting in the frame control (FC) field.

10. Data Compression

Another aspect of the invention provides data compression of packets trains, such as implementation of algorithms based on run-length encoding and Huffman encoding, and variations of Lempel-Ziv algorithms. Run-length encoding refers to replacement of sequences of identical source elements by a triple consisting of a special code indicating a "run" of elements, a count of the run length and the repeated element. Huffman encoding translates fixed-sized source elements into variable-sized codes, where the size of the output code and bits is approximately the logarithm of the probability of the source element. For some kinds of data, the probabilities of elements are well known and fixed translation tables are available. In more general cases, where the distribution of source elements is not known, a translation table can be computed for a sum block of input data, and transferred along with the data to allow decompression. This requires two passes over the input during compression; table size must be significantly smaller than the data blocks.

The Lempel-Ziv algorithms convert variable-sized input elements, or strings, into fixed-sized codes. Allowing long input sequences gives the possibility for higher compression ratios than are possible with fixed-sized source element algorithms, such as Huffman encoding. The Lempel-Ziv algorithms are adaptive in that translation tables are built dynamically to reflect characteristics of the input, but require only a single pass during encoding. Decompression can be performed by dynamically building the same translation tables as were used during compression, using information implicit in the encoded data stream such as whether a particular code has been encountered.

The typical ranges of compression ratios of a compression algorithm selected to compress packet trains vary from unity for certain kinds of inherently random data such as floating point data or previously compressed data, to eight for some data bases containing large amounts of redundant or null data. The average compression ratios over mixed input types depends on the chosen samples, but ratios of between two and four for fairly large samples of mixed input found on real computer systems are common; two is proposed as an example in the preferred embodiment.

Error detection and correction, as a surrounding protocol on compressed data to allow non-delivery of corrupted blocks, is required since any errors lead to catastrophic corruption of the rest of the packet train. The D-channel has built-in error protection by virtue of using the HDLC protocol which includes error detection, packet sequencing and re-transmission.

11. Virtual B-channel Formation

Figure 16:
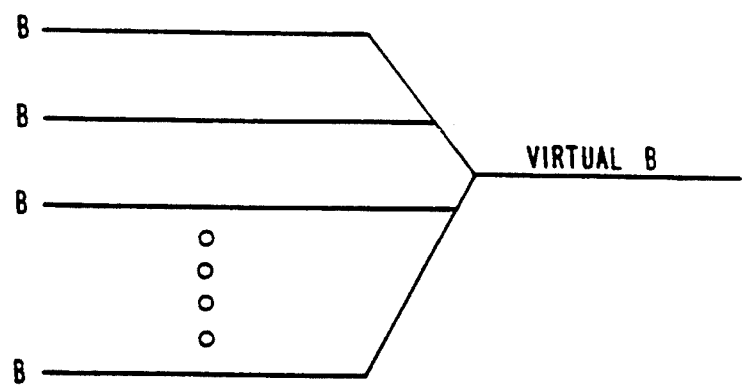
FIG. 16 is a symbolic diagram showing development of a virtual channel and its components.
Figure 17:
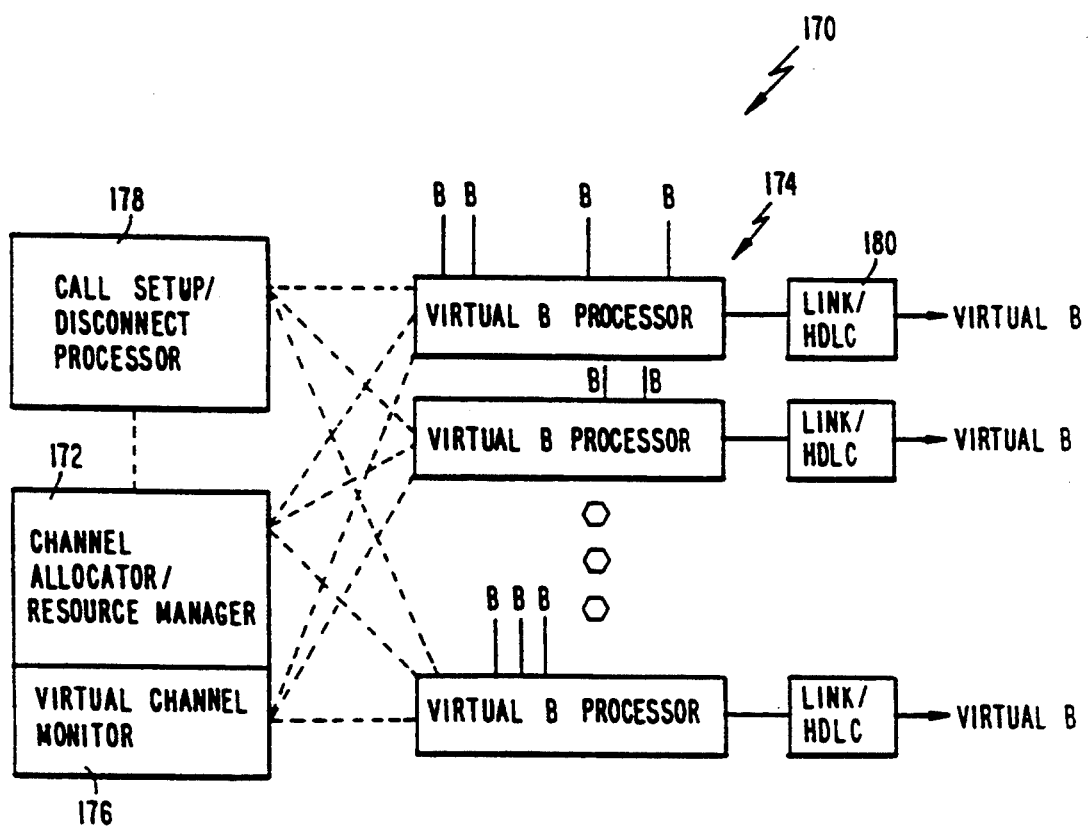
FIG. 17 is a block diagram of circuitry for carrying out LTA channel allocation in accordance with another aspect of the invention.

In accordance with an aspect of the invention, shown in FIG. 16, virtual B channels are formed out of a B channel pool in response to traffic on the ISDN line. A controller 170 shown in FIG. 17, comprises a virtual B Allocator/Resource Manager 172 which opens a virtual B-channel with control attributes in table I, below, from the B-channel pool as requested. Manager 172 also assigns a virtual B processor 174 implemented from among a plurality of such processors, and handles related supporting global resources. The virtual B processors 174 at run time or initialization time provide the service of transparent addition and deletion of new or existing component channels in its virtual B-channel based on virtual B attributes. The processors 174 further provide transparent multiplexing of client data. Virtual B-channel monitor 176 carries out traffic and error monitoring of all virtual B-channels. Data traffic flow and allocation, day allocation and replacement of channels to dynamically alter bandwidth are performed by the monitor 176.

Call set-up/disconnect processor 178 sets up and disconnects protocol on the D-channel. Processor 178 interfaces to B-channel hardware to transform the B-channel call set-up or disconnect, and interfaces with the virtual B processors 174, resource manager 172 and client. HDLC/LAPD links 180 provide the variable links for client, and are optional.

Component channels allocated for a virtual B-channel have the following four defined states: activated, deactivated, transient and steady. In the deactivated state, data transfer is forbidden although control protocol exchange is not. Component channels allocated or joined are initially in the deactivated state. A channel, deactivated for a sender immediately following the deactive_b command, described later, is queued for transmission. For a receiver, a channel is deactivated immediately after the command is received. Only a bi-directionally deactivated channel is removed and physically disconnected from the virtual channel of which it was a member.

In the activated state, both data and control protocol transfer are permitted. A channel is activated to a sender only after acknowledgement of the active_b command transmitted is received. For a receiver, a channel is activated immediately after this command is received.

The transient state is defined by guarding periods arriving before acknowledgements are received from the far-end. A virtual channel is transient when any component channels are transient. No data can be sent over a channel in the transient state.

A component channel is in the steady state if it is not in the transient state, that is, if it is activated or deactivated. A virtual channel is in the steady state if all its components are in the steady state.

A virtual B-channel is operative in two multiplexing modes, restricted mode and forced load-balancing mode. In the restricted mode, data received for transmission is sequentially distributed, one packet at a time, in a round-robin fashion over the steady activated component channels; deactivated channels are skipped. The far-end virtual B processor 174 receives and recovers data in the same round-robin sequence. In the load-balancing mode of operation, the distribution for transmissions over the channels follows a protocol of most-empty-channel-first for transmission. The receiver recovers it by the global sequence numbers by scanning, comparing and carrying out trace-back time-out presentation. During either distribution process, active_b commands, described below, are set in-line on the deactivated component channels. For component channels to be deactivated, deactive_b commands are sent in-line over these channels in place of the data in the sequence. Time-fill SYNC_vB packets may be sent over channels in the restricted mode of operation to avoid "holes" in the data stream, and further can be used for time control in the load-balancing mode of operation.

12. Control and Multiplexing

The following are the command categories and their detailed format with bit definitions. This protocol assumes the use of flow control to be optional, at least to some degree, depending on the implementation and environment. In the restricted mode, this can be controlled by the client link level protocol; outstanding transmissions preferably should not result in difference of twenty-six generations or more between the receiving and the far-end transmitting loop. The load-balancing mode has the same format except that all the numbered command category head-bytes described below will be two bytes in length.

* DATA

Ossnnnnn: one byte as header of client's data for transmit.

* RQST_Bs

101nnnnn: one byte header of one or more multiple control bytes. The first control byte can further specify explicitly whether it is global. If it does not specify, it depends on the address bytes which follow. No address byte for the in-band operation is required, and multiple address bytes imply the in-band line is not explicitly included. The explicit global commands have the leftmost bit on, followed by explicitly specified address bytes. If the leftmost two bits are both on, it is a broadcast, and no address bytes follow. Multiple bytes are useful for off-band control. At present, only one byte of in-band control is employed. The leftmost third bit is reversed, and the fourth bit is for system control point specification. These are external or internal indicated by E and I respectively as follows. The last four bits define the commands of this category. At present, these are:

| | |
|---|---|
| DEACTIV_Bs group: | uwx1z, w bit is reserved and u defines two system points. |
| DEL_Bs - (OXOO | O), an external delete command |
| DEX_Bs - (DEL_Bs external setup | 1), an DEL_Bs, followed by |
| DIL_Bs - (DEL_Bs delete command | 0X10), internally initiated |
| DIX_Bs - (DEX_Bs internal setup | 0X10), DIL_Bs, followed by |
| ACTIV_Bs group: | uwxOz, w bit is reserved, u the same as defined above. |
| ADD_Bs - (0X00 | 2), an external add command. |
| AID_Bs - (ADD_Bs initiated ADD_Bs | 0X10), an internally |
| * SYNC_vB | |
| 110nnnnn: one byte only, used for time-fill and synchronization. | |
| * RA_Bs | |

111nnnnn: one byte header, followed by no or multiple optional bytes. This is an acceptance acknowledge in reply to a RQST_Bs, and in-band is implied if no other bytes follow. Similar to the case in RQST_Bs, the first by to which follows can further specify whether it is global. The leftmost two bits have exactly the same meanings, which describe the scope of the possible further succeeding address bytes. The leftmost third bit, if on, turns the whole meaning of the response into a negative acknowledgement, instead. The last five bits are the same as for RQST_Bs.

* MODE_vB

1000000m: for virtual channel operation and format specification. This has two members, MODE_rst with m=0 and MODE_lbc with m=1; MODE_rst defines the nnnnn five bit generation number in restricted mode. In the load—balancing mode, it handshakes with MODE_lbc, with thirteen (13) bits global sequence numbers, when opening a virtual B. The attributes of Table I below, to follow after these headers are optional. The mode negotiation can proceed only when all component channels are in deactivated states, or UNA will be received. if the optional attributes are not accepted, UNA will also be received. A REJ will be received if the remote end does not support or will not accept this request. In addition to this role of mode negotiations, MODE_vB resets the generation number or the global sequence number for transmitter and the corresponding variable back to 0 to restart and resets the transmitter and receiver (loop) pointers back to the first component position.

* RR

10000010: Informs the far-end receiver that this end is ready.

*

10000011: Informs the far-end receiver that his end is not ready.

* ATTRB_vB

100000100: The parameters in Table I follow this for far-end negotiation.

* UA

10010000: This numbered positive response means acceptance in the mode negotiation. The same MODE_vB packet will be sent back as bi-direction initialization, following the UA. The UA is also used for acknowledgement to flow control commands RR and RNR. It is used for acceptance acknowledgement to ATTRB_vB as well as unnumbered commands.

* UNA

10010100: a negative response for refusing, used similarly to UA.

* REJ

10011100: as explained in the MODE_vB description.

All these unnumbered are in-band, although MODE_vB is for global. The "nnnnn" is a module 32 correlation generation number, or a zero based global sequence number, assigned to each round of transmissions in restricted mode of operation, or assigned and incremented by one for each numbered transmission in the load balanced mode. The "ss" in the DATA command, which has four values 11, 10, 01 nd 11, is for frame segmentation.

Processing of these commands is independent of their arriving timing phase with respect to other channels, once dequeued. The sequence numbers are for data synchronization across the component channels. A receiver variable "nr", used for synchronization, is incremented by one after each round, or each actual numbered reception. This is a recovery process corresponding to the far-end sender's sequence number increment for each round, or each data or numbered command transmission.

Once mode negotiation is done, sequence number comparison is then started. The selected virtual B processor 174 polls the receiving queue and then steps to the next component channel. In restricted mode, if nothing arrives in the queue of an activated channel, the processor stays and waits indefinitely. In the case of MAC implementations, the processor waits indefinitely or steps after a time out period if a trace-back timer has been started, regardless of the channel states. At a deactivated component channel, the processor hunts through all following contiguous deactivated channels for any arrival, and does trace-back get, steps or stays until the trace-back timer expires, if arrival time inversion is found. The time-fill SYNC_vB commands are to be received over their preceding channels, if no other commands or data are available through these channels. The receptions in load-balancing mode are always in hunting mode, across the full range of component channels. The processor continues looking for the correct sequence number for presentation. Trace-back time-out presentation scheme applies in either mode.

Parameters which characterize a virtual B-channel to be opened and used to monitor the channel hereinafter are listed in Table I.

TABLE I

| Virtual B Channel Attributes (in C language representation) |
| --- |
| typedef struct { |
|     long    err_threshold;    /* one out of err_threshold frames */ |
|     short   err_action_thres;    /* act on contig err_action_thres */ |
|     short   err_action_permit;    /* allow deactivation of errored channel */ |
|     short   max_band_width;    /* max allowed bandwidth */ |
|     short   high_util_thres;    /* high effective % band width threshold */ |
|     short   high_busy_util_thres;    /* one high util out of high_busy_util */ |
|     short   high_action_thres;    /* act on contig high_busy_util_thres */ |
|     short   high_action_permit;    /* allow bandwidth increment actions */ |
|     short   min_band_width;    /* minimum allowed bandwidth */ |
|     short   low_util_thres;    /* low effective % bandwidth threshold */ |
|     short   low_busy_util_thres;    /* one low util out of low_busy_util */ |
|     short   low_action_thres;    /* act on contig low_busy_util_thres */ |
|     short   low_action_permit;    /* allow bandwidth decrement actions */ |
|     short   set_up_retry_thres;    /* max contig retry before giving up */ |
|     short   no_action_thres;    /* no action threshold time */ |
| } VB_THRESHOLD; |

13. Traffic Sensing

Sensing of traffic for automatic control of bandwidth is carried out as follows. Assuming that the sampling rate is one sample every two seconds, the maximum bandwidth of the virtual channel opened is set to be five B-channels, definition of the high_util thres is 75%, of a high_busy_util_thres is 5, the high action_thres is ten and the initial channel opened is one B-channel (64 Kbps). As transmission rate increases steadily from an original effective rate of 45 Kbps to 55 Kbps, a procedure for adding a new line is automatically initiated thirty seconds later. This assumes that the high_action_permit is true. A new element channel is added and the new line utilization will be 42.3% if traffic is maintained at 55 Kbps. An increase in input data rate thus drives up bandwidth growth. If the input data rate continues to increase, the bandwidth eventually will reach five B-channels as a maximum.

When traffic decreases, assuming that the low_util thres is 30%, and the low_busy_util_thres and low action_thres are five and ten, respectively, no line will be deleted from the virtual B if a pattern of the driving traffic does not have a utilization of less than 30% in any continuous ten seconds or there is no consecutive repeating ten or more times. If the low action_permit is false, no reduction in virtual B-channel is permitted. The attributes of the virtual B thus define the bandwidth control behavior.

If line error rate is above a predefined threshold rate for a predetermined period of time, line replacement operations are reduced in addition to bandwidth control.

14. Conclusion

As described hereinabove, an ISDN gateway for personal computers comprises circuit boards resident in each computer for carrying out protocol conversion and other network interface functions. Two embodiments of the gateway interconnect the ISDN respectively to a personal computer and to a local area network. To improve bandwidth utilization of the ISDN line while transferring voice or data, a B-channel allocation algorithm executed by the gateway and the ISDN line dynamically allocates bandwidth by monitoring traffic at each destination queue and responsively allocating or deallocating virtual B-channels. Bandwidth utilization is optimized by packaging data packets into trains that are transmitted to the destination when the train is completed and upon satisfaction of other conditions. Each train undergoes data compression by execution of a suitable compression algorithm.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. An ISDN gateway at a customer premises for interfacing a host computer to an ISDN line for communications with another host computer or with a remote local area network, comprising:
    at least one circuit module resident with said host for interfacing said host to said ISDN line, said at least one circuit module including
    (a) means for performing protocol conversion of data flowing between said host and ISDN line through said gateway;
    (b) means for establishing input and output destination queues for said gateway;
    (c) means for measuring traffic flow at each said input and output destination queues during a particular time interval; and
    (d) means responsive to said traffic flow measuring means for dynamically allocating channel bandwidth on said ISDN line.

2. An ISDN gateway as recited in claim 1, wherein said at least one circuit module includes system master means for managing a configuration of said gateway.

3. The ISDN gateway as recited in claim 2, wherein said at least one circuit module further includes means for accessing system master means of other gateways on said ISDN line.

4. The ISDN gateway as recited in claim 1, wherein said at least one circuit module includes a communication mode adaptor providing modem dial up protocols.

5. The ISDN gateway as recited in claim 1, wherein said at least one circuit module includes an ISDN manager means for receiving and routing incoming data, said ISDN manager including said means (b)-(d), and means for setting up, selectively, circuit switched and virtual circuit calls.

6. The ISDN gateway as recited in claim 1, wherein said at least one circuit module includes an ISDN device driver.

7. The ISDN gateways as recited in claim 1, wherein said at least one circuit module includes a configuration control manager storing a table of gateway operating parameters.

8. The ISDN gateway as recited in claim 1, wherein said means (d) includes long term channel allocation means for allocating or deallocating transmission channels to a particular destination on said line depending upon data flow traffic to said destination and particular channel parameters; and
    short term channel allocation means, overriding said long term channel allocation means in response to predetermined conditions, for allocating or deallocating transmission channels on said line.

9. The ISDN gateway of claim 8, including means for assembling pluralities of packets into trains, each consisting of a predetermined number of packets, and means for transmitting and trains onto said ISDN line.

10. The ISDN gateway of claim 9, including means for compressing said trains prior to transmission thereof onto said ISDN line.

11. The ISDN gateway as recited in claim 1, wherein said means for dynamically allocating channel bandwidth provides allocating or releasing channels of a plurality of the channels associated with a prescribed destination.

12. The ISDN gateway as recited in claim 11, wherein said channels comprises a B-channel.

13. The ISDN gateway as recited in claim 11, wherein said plurality of channels are circuit-switched channels dynamically set up or torn down in response to the traffic flow.

* * * * *